H. J. BURKE.
WATER-FILTER.
No. 176,593.　　　　　　　　Patented April 25, 1876.
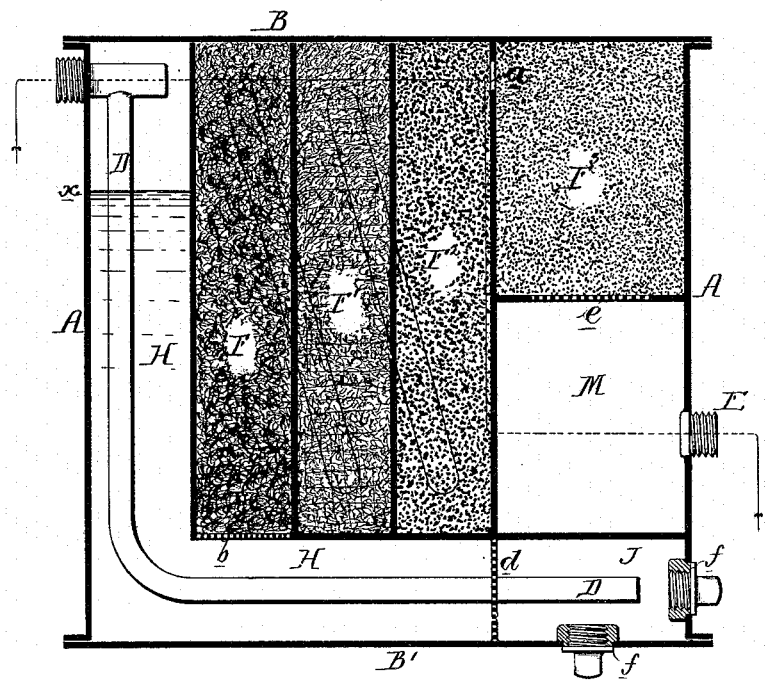
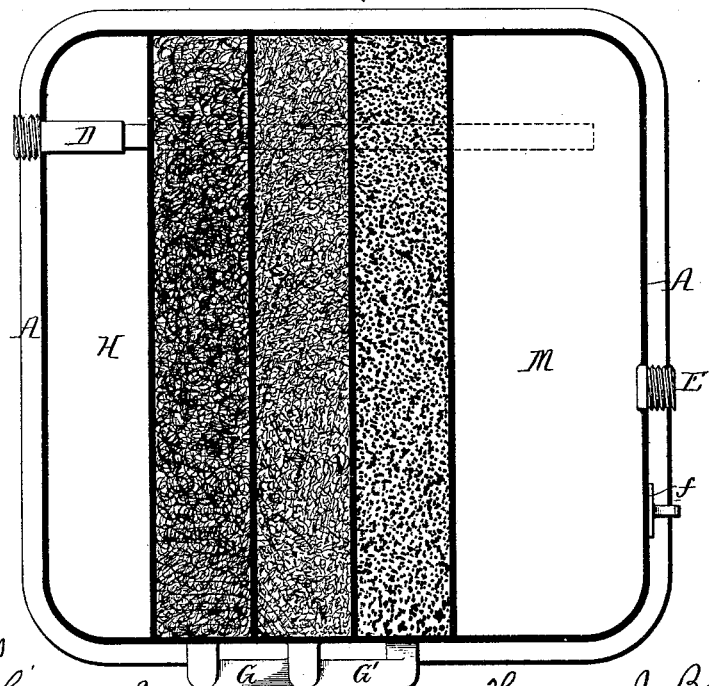
Witnesses
Harry Howson Jr.
Harry Smith
Henry J. Burke
by his Attorneys
Howson and Son

UNITED STATES PATENT OFFICE.

HENRY J. BURKE, OF PHILADELPHIA, PENNSYLVANIA.

IMPROVEMENT IN WATER-FILTERS.

Specification forming part of Letters Patent No. 176,593, dated April 25, 1876; application filed March 22, 1876.

*To all whom it may concern:*

Be it known that I, HENRY J. BURKE, of Philadelphia, Pennsylvania, have invented certain Improvements in Water-Filters, of which the following is a specification:

The main object of my invention is to so construct a filter that the water will pass through the filtering material steadily and without intermission or pulsations, a further object being to so arrange sediment collecting and filtering chambers within the casing that the water will be thoroughly purified before it reaches the outlet. These objects I attain in the manner which I will now proceed to describe, reference being had to the accompanying drawing, in which—

Figure 1 is a vertical section of my improved filter; and Fig. 2, a sectional plan on line 1 2.

A is the outer casing of the filter, having a top, B, and bottom B′, secured to the body in any suitable manner. D is the inlet-pipe; E, the outlet-nozzle; and F F$^1$ F$^2$ F$^3$ the chambers containing the usual filtering materials. The chambers F and F$^1$ communicate with each other through an inclined pipe, G, on the outside of the casing, and the chambers F$^1$ and F$^2$ communicate with each other through a similar pipe, G′, and an opening, $a$, in the partition, between the chambers F$^2$ and F$^3$, serves to establish communication between the same. The chamber F communicates at the bottom through a screen, $b$, with a chamber, H, which extends along one side and part of the bottom of the apparatus, and communicates through a screen, $d$, with a chamber, J, into which the water first enters from the inlet-pipe D.

The water on entering the chamber J deposits the greater portion of its solid impurities before passing through the screen $d$ into the chamber H, in which it rises to about the height shown by the line $x$ in Fig. 1, and compresses the air in the upper portion of this chamber, and this supply of compressed air insures the steady flow of the water through the filtering-chambers, into the first of which it enters through the screen $b$, and passes upward through the filtering material, thence through the tube G to the bottom of the chamber F$^1$, up through the latter, and through the tube G′ to the bottom of the chamber F$^2$, upon arriving at the top of which it passes through the opening $a$ into the chamber F$^3$, through the filtering material in the same, and through a screen, $e$, into the chamber M, from which it is withdrawn, as required, through the nozzle E.

The chamber J can be readily cleansed by first removing the screw-plugs $f f$, and then forcing water into one opening in the casing and out through the other.

The equalizing-chamber H is an important feature of my invention as it serves to neutralize the pulsation of the water, which is caused by sudden changes of pressure in the pipe D, the disturbance of the filtering material which usually results from these pulsations being thus prevented.

By compelling the water to take the circuitous course described, the filtering material is thoroughly utilized, and the water is delivered in a perfectly pure state at the outlet.

I claim as my invention—

1. The combination, in a water-filter, of one or more filtering-chambers, with an air-chamber, into which the water must pass before it enters the said filtering-chambers, all substantially as set forth.

2. The combination of the sediment-collecting chamber J with the detachable plugs $f f$.

3. The combination of the filtering-chambers F, F$^1$, and F$^2$, contained in the same casing with the connecting-tubes G G′.

In testimony whereof I have signed my name to this specification in the presence of two subscribing witnesses.

HENRY J. BURKE.

Witnesses:
 HARRY HOWSON, Jr.;
 HARRY SMITH.